(12) United States Patent
Vila Bonas

(10) Patent No.: US 8,104,703 B2
(45) Date of Patent: Jan. 31, 2012

(54) MEAT MINCING AND MIXING MACHINE HAVING DUAL MODE OPERATION

(75) Inventor: Juan Vila Bonas, Granollers (ES)

(73) Assignees: Juan Vila Bonas, Granollers (Barcelona) (ES); Jaime Ramon Vila, Granollers (Barcelona) (ES)

( * ) Notice: Subject to any disclaimer, the term of this patent is extended or adjusted under 35 U.S.C. 154(b) by 131 days.

(21) Appl. No.: 12/728,717

(22) Filed: Mar. 22, 2010

(65) Prior Publication Data

US 2010/0243777 A1   Sep. 30, 2010

(30) Foreign Application Priority Data

Mar. 30, 2009 (ES) .................... 200900623

(51) Int. Cl.
*B02B 5/02* (2006.01)

(52) U.S. Cl. ............ 241/101.8; 241/82.1; 241/82.4; 241/82.7

(58) Field of Classification Search ........... 241/101.8, 241/82.1–82.7
See application file for complete search history.

(56) References Cited

U.S. PATENT DOCUMENTS

| | | | | |
|---|---|---|---|---|
| 3,570,569 A | * | 3/1971 | Hartley et al. | 241/82.6 |
| 3,743,192 A | * | 7/1973 | Otto | 241/101.8 |
| 3,770,216 A | * | 11/1973 | Holly | 241/82.1 |
| 3,984,056 A | * | 10/1976 | Hartley | 241/82.1 |
| 4,650,337 A | * | 3/1987 | Otto | 366/70 |
| 4,705,222 A | * | 11/1987 | Shohet | 241/69 |
| 4,795,104 A | * | 1/1989 | Rudibaugh | 241/78 |
| 5,292,637 A | * | 3/1994 | Bohnensieker | 435/3 |
| 5,607,113 A | * | 3/1997 | McGuffin et al. | 241/82.1 |

* cited by examiner

*Primary Examiner* — Bena Miller
(74) *Attorney, Agent, or Firm* — Michael J. Striker

(57) ABSTRACT

A meat mincing and mixing machine with a dual mode operation has a tilting mixing vat with inner rotating mixing blade fixed to a longitudinal horizontal axis, a unit for actuating the tilting mixing vat, a support and fixation device for supporting the axle detachably together with the mixing blades for cleaning and maintenance, a mincing body supporting the vat, separated by a sliding track door, and provided with a mincing spindle located inside the mincing body with a horizontal axis and a longitudinal direction, parallel to the longitudinal horizontal axle of the mixing blades and aligned against a front exit mouth, a protective casing covering the front exit mouth and rotating about a lower axle, a unit for actuating the mincing spindle, a folding screen provided at the rear of the vat and protecting against splattering, and actuation controls.

9 Claims, 5 Drawing Sheets

MEAT MINCING AND MIXING MACHINE HAVING DUAL MODE OPERATION

CROSS-REFERENCE TO A RELATED APPLICATION

The invention described and claimed hereinbelow is also described in Spanish Utility Model 2009 00623 filed on Mar. 30, 2009. This German Patent Application, whose subject matter is incorporated here by reference, provides the basis for a claim of priority of invention under 35 U.S.C. 119(a)-(d).

BACKGROUND OF THE INVENTION

Meat mincing and mixing machine having dual mode operation.

The object of the present invention is a machine destined for mincing and/or mixing meat, as a preliminary phase in the preparation of cold meats and similar, essentially characterised in that the layout and structure of its different components allow it to carry out the mincing and/or mixing of the meat, in addition to being used as a traditional kneader and/or for maceration. The basic components of said machine are described below.

As indicated in the preceding paragraph, in order to prepare the traditional and well-known cold meats, in their numerous variants, the meat used as raw material must be subject to mincing, an operation that is carried out immediately after carrying out adequate mixing, completing this preliminary preparatory cycle with kneading that correctly eliminates all traces of air that could remain inside the meat mass being manipulated; air which, in the event of remaining therein, could damage the product being prepared.

Mixing machines which, in turn, combine the mincing operation are known to exist. The mixing vat is generally fixed in place or can only be fully disassembled from the rest of the machine for cleaning or maintenance thereof, which is very cumbersome.

Likewise, in these known machines that have mixing blades disposed parallel or perpendicular to the mouth, the passage from the mixing vat to the mincing area is always open, due to which it is impossible to use the part of the machine that consists of the mixing vat with its blades and the geared motor actuator mechanism to carry out complementary, but basic, operations, such as those mentioned earlier, such as kneading and macerating, due to not being able to isolate the vat.

SUMMARY OF THE INVENTION

The meat mincing and/or mixing machine that is the object of the present invention, and which is intended for carrying out preliminary mixing, offers industrialists the possibility of using its components in their entirety, in order to carry out the essential preliminary mixing and, in an immediate and continuous manner, mincing of the meat, evacuating the product thus treated through a front exit mouth disposed in the lower part of the machine, and proceeding, in a second phase, to knead the product, pouring it into the mixing vat once again, upon adequately isolated it from the mincing area by means of an adequate trap door and proceeding, upon carrying out said mixing, to empty the vat by tilting it to one side.

This variation in the process confers the machine assembly its peculiar functionality and dual mode operation.

The necessary controls, in addition to the different microswitches and safety limit switches, allow different operations to be carried out in the previously established sequences.

The machine has an electrically actuated geared motor assembly for moving blades disposed in the interior of the mixing vat, ready to function in either direction of rotation, in accordance with the operation being carried out, and a second geared motor assembly, also electrically actuated, for moving the spindle that minces the previously mixed meat.

The mechanical assembly of the machine has both actuation units disposed in the same vertical axial plane, in such a manner that the actuation axle of the blades in the interior of the mixing vat and the mincing spindle axle are parallel to each other, the former disposed on top of the latter.

The assembly is complemented by the necessary devices that complete the machine's operating safety, both for the benefit of the user and the quality of the product prepared.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
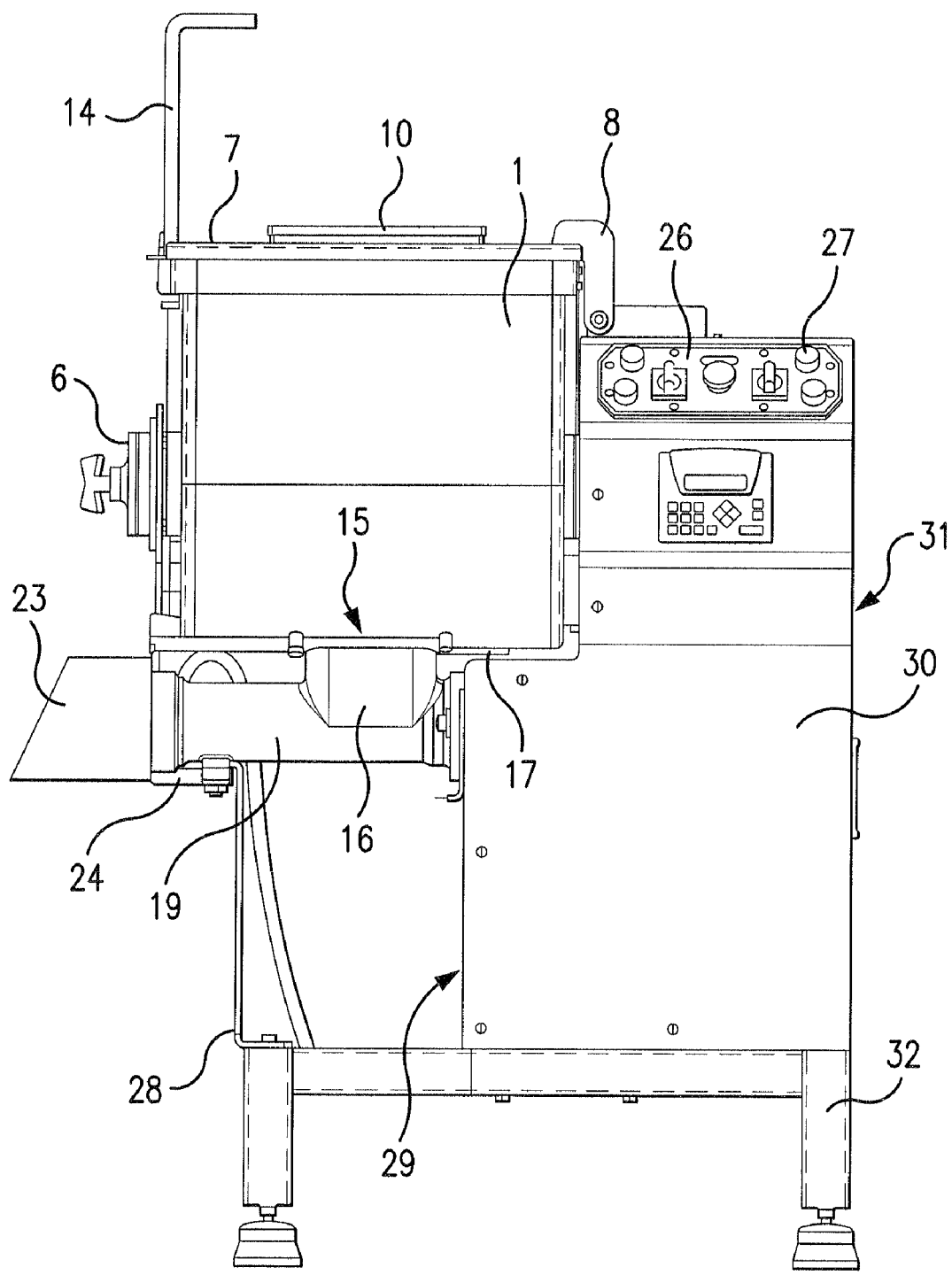
FIG. 1 shows an elevational side view of the machine in accordance with the present invention.

The meat mincing and mixing machine in accordance with the present invention has a mixing vat (1), wherein rotating mixing blades (2) are disposed and fixed in a radial direction to a longitudinal horizontal axle (3), whereto other mixing blades (2a) are also fixed. This longitudinal horizontal axle (3) is joined to the actuation assembly, disposed on the side of the vat corresponding to the rear part of the machine, said assembly being formed by the reduction gear (4) and electric motor (5).

At the other end of the axle (3) there is a support and fixation (6) device, a usual and known mechanism, which allows the aforementioned axle (3) to be released for easy extraction thereof, together with its mixing blades (2) and (2a), for cleaning and maintenance.

The vat (1) is equipped with a lid (7) which, for pivoting or lifting thereof, has rear hinges (8). A latch (9) guarantees the closure of the lid (7) during the process.

On the upper face of the aforementioned lid (7) there is a window (10) covered by a transparent protection plate and a series of slots (11) for introducing the necessary products for the mixing, kneading or macerating operations, without the need to open the lid (7), and for allowing the air produced during the process to exit.

Finally, a folding screen (12) is disposed in the upper rear part of the vat (1) for protection when depositing the meat to be treated in the interior of said mixing vat (1), upon lifting the lid (7).

The repeatedly mentioned mixing vat (1) is characterised in that it is axially tilting towards one side, the tilting axle being the longitudinal axle (3), having a safety latch (13) that maintains the vat (1) in its initial upright working position, whereupon the bolt of said latch (13) must be removed in order to tilt the vat (1) forwards. This operation will be carried out manually by the user, by actuating an upper lever (14) disposed thereon.

Figure 2:
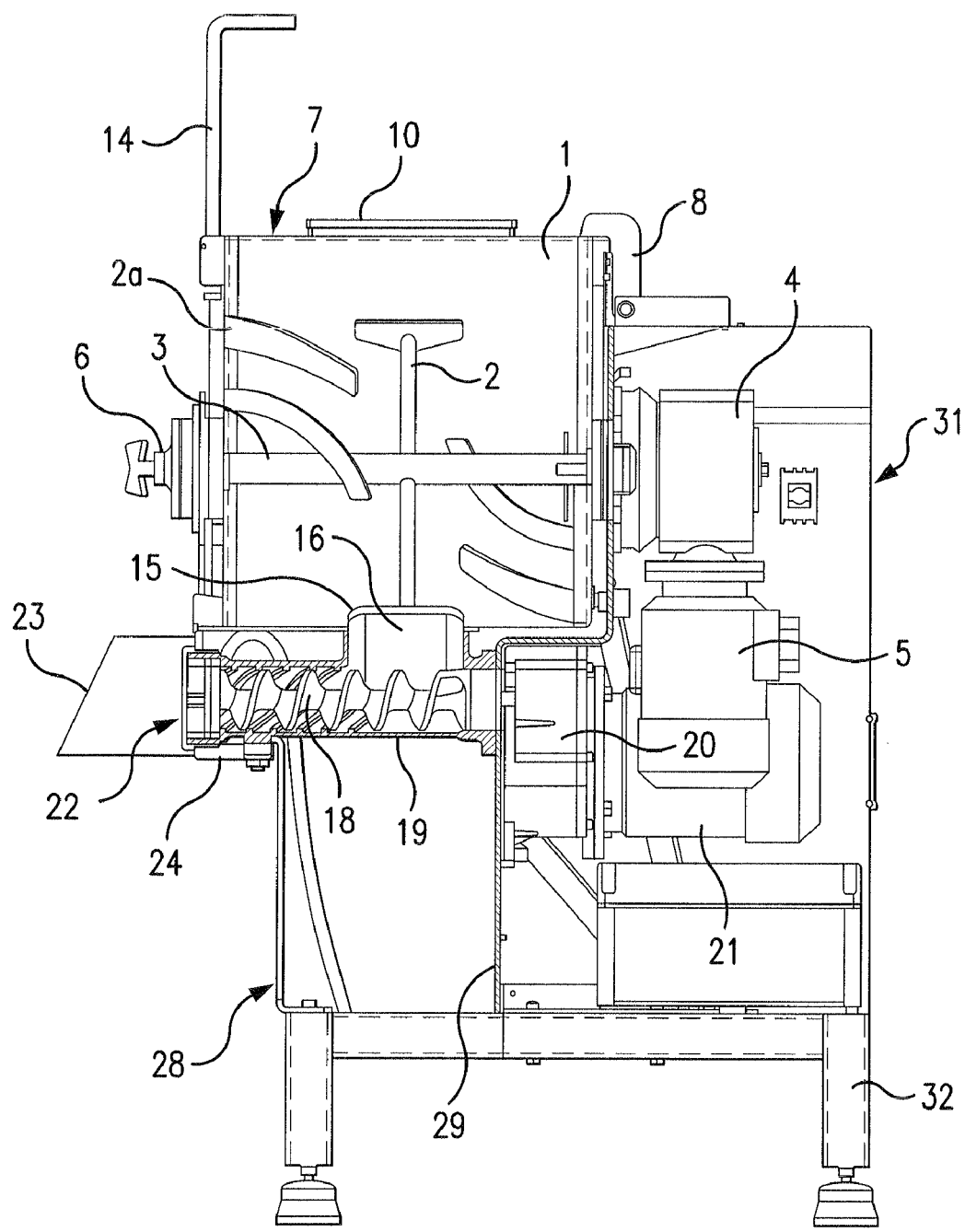
FIG. 2 shows an elevational side and conveniently sectional view, corresponding to the preceding figure, of the machine in accordance with the present invention.
Figure 3:
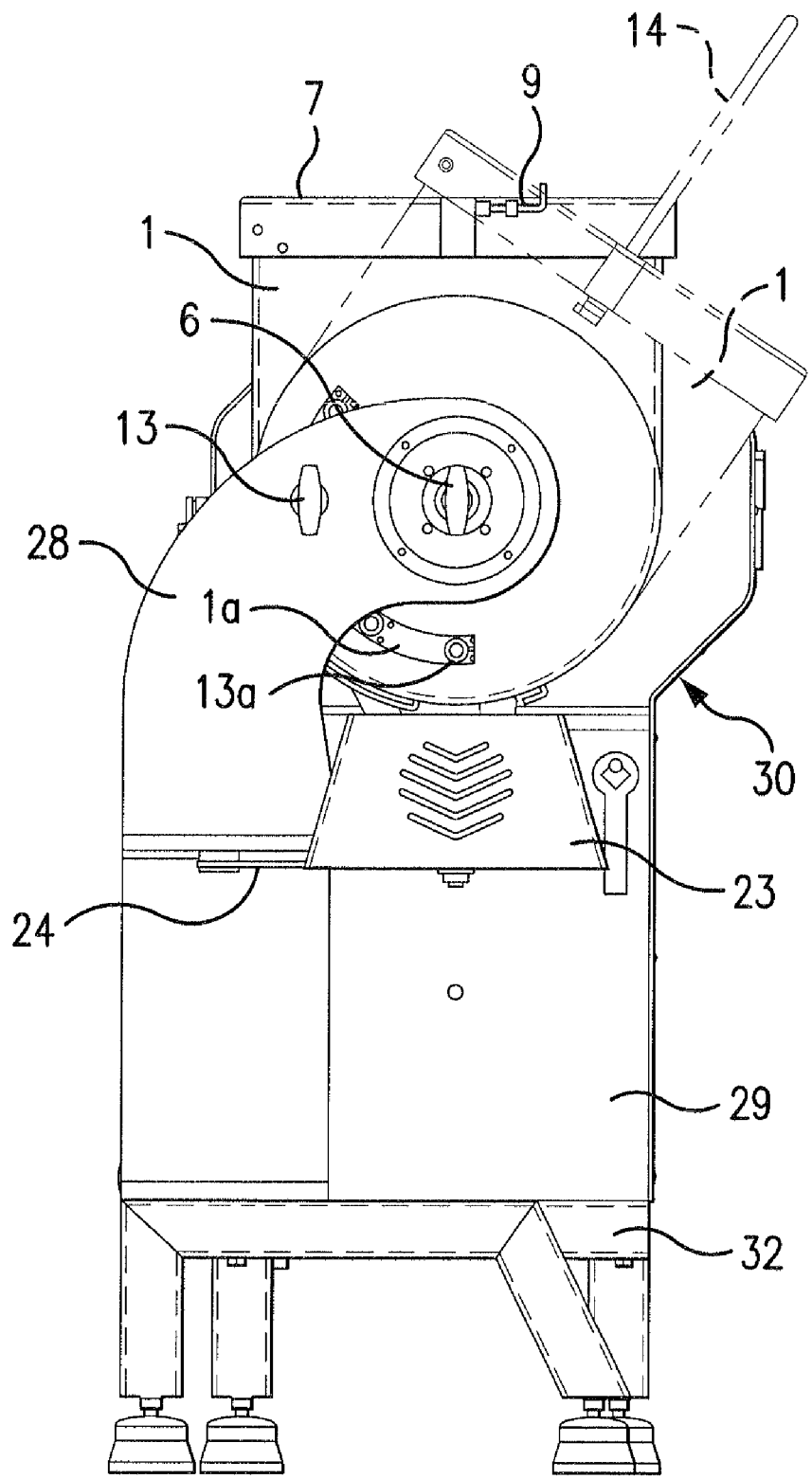
FIG. 3 shows an elevational front view of the described machine in accordance with the present invention.
Figure 4:
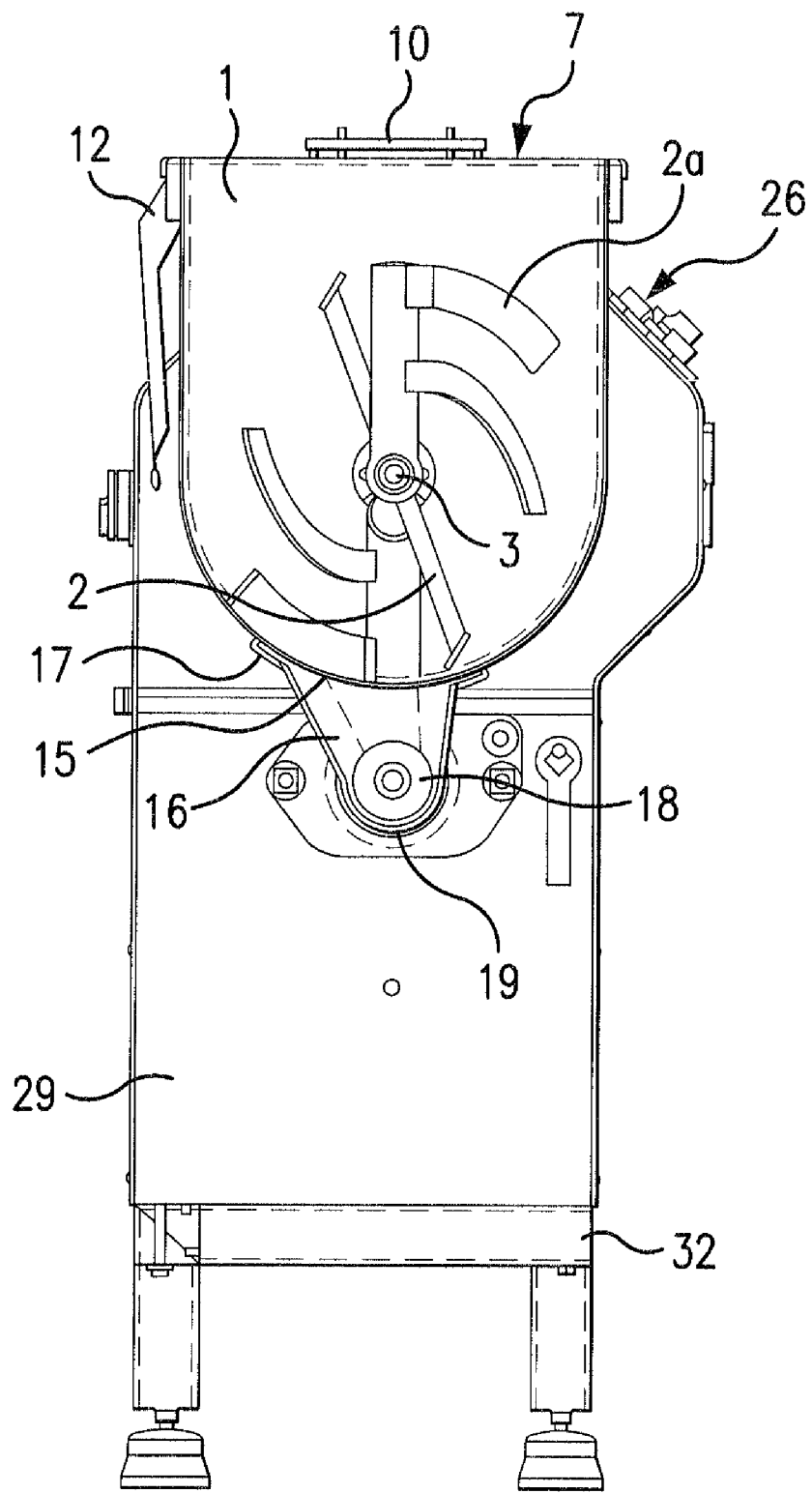
FIG. 4 shows a conveniently sectional view of the machine, in a front view corresponding to the preceding figure in accordance with the present invention.
Figure 5:
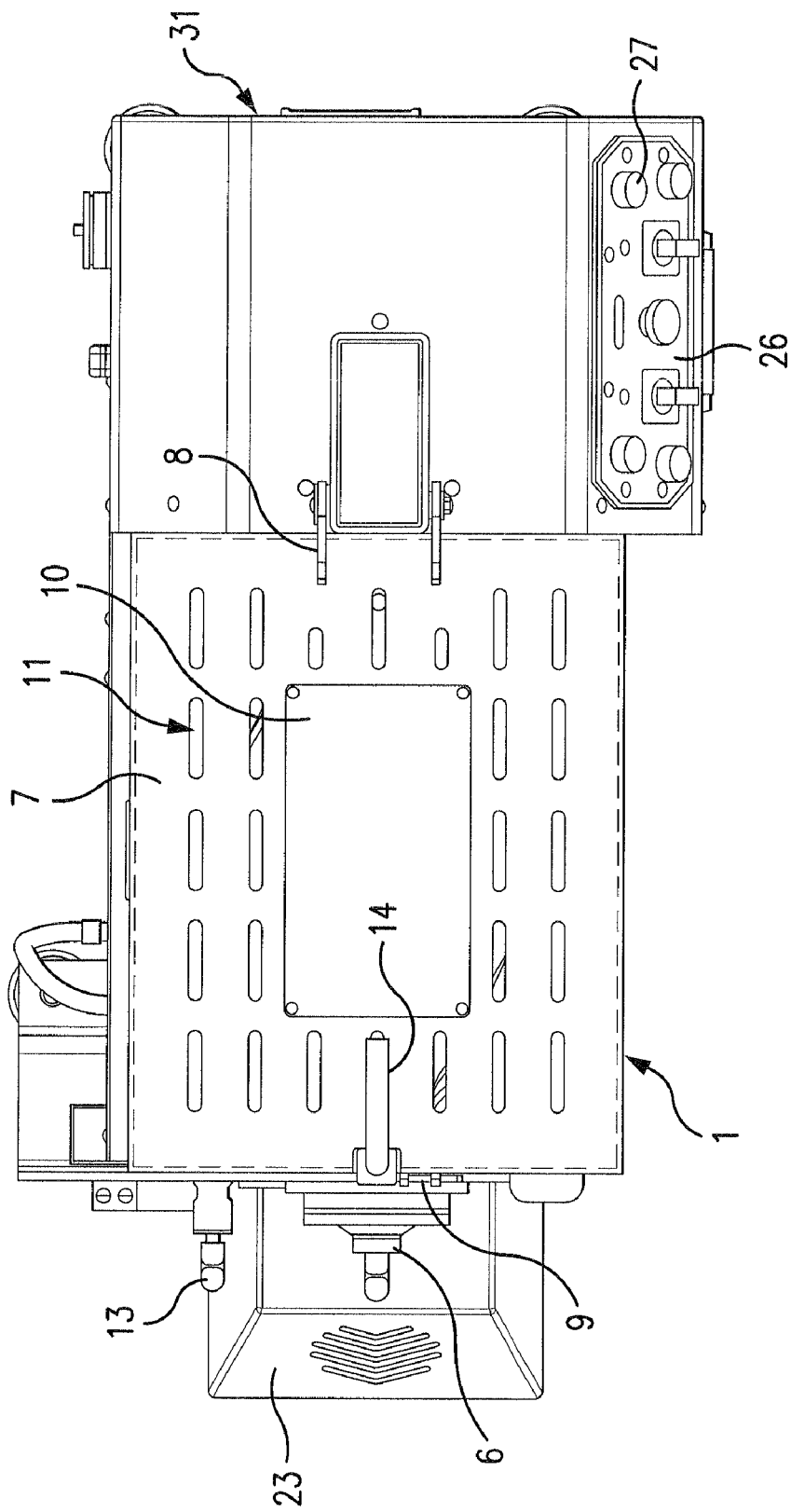
FIG. 5 shows a plan view of the machine itself in accordance with the present invention.

The tilting path of the vat (1) is defined by an opening in the form of a circular segment (1a), disposed on the side of the vat (1) itself and wherethrough a butt guide (13a) is displaced, limiting the aforementioned path. Another characteristic of the mixing vat (1) is the specially disposed sliding trap door (15) that closes the mouth (16) at the base thereof and which communicates with the lower mincing area of the machine, right on top of a spindle (18), as clearly shown in FIG. 2.

This sliding trap door (15), conveniently equipped with a handle for displacement thereof (not represented), adopts two positions: the laterally displaced position, leaving the passage that communicates the vat (1) with the rotating mincing spindle (18) through the aforementioned mouth (16) open, and the non-displaced position, wherein said passage is closed and the mixing vat (1) is completely closed in its entirety, only being accessible, both for filling and emptying, through its upper mouth, said filling being carried out by simply lifting the lid (7) and said emptying being carried out by tilting the vat (1) towards one side.

Lateral tracks (17) guide the trap door along its lateral displacement, as described in the preceding paragraph.

The rotating mincing spindle (18) constitutes the basic element of the area of the machine where the meat is minced. Said spindle (18), horizontally disposed underneath the mixing vat (1), in the same direction as the longitudinal axle (3) of the mixing blades (2) and (2a), is installed in the interior of the mincing body (19) and is solidary with the actuation mechanism disposed on the rear of the machine, and consists, preferably, of a gear reduction assembly (20) and the relevant geared electric actuation motor (21).

The front part of the mincing body (19) ends in a front exit mouth (22), covered by a protective casing (23) that prevents accidental access to said exit mouth and, consequently, prevents users from suffering accidents. Said casing (23) rotates about a lower axle (24), in such a manner that when it rotates it allows access to the exit mouth (22) of that action area of the rotating spindle (18), also having an adequate microswitch which, for safety reasons, automatically stops the movement of the spindle (18) when the casing (23) is displaced, for the purpose of cleaning it.

The movement transmitted by the geared motor assembly (20/21) to the spindle (18) may be reversed on certain occasions, in the event of obstruction during the meat mincing process, generally due to the presence of a bone splinter or other similar impurities. The rotation of the spindle (18) in the reverse direction facilitates unblocking of the mincing area.

In turn, the movement transmitted by the geared motor assembly (4/5) to the axle (3) of the blades (2) and (2a) is, at certain times during the work cycle, clockwise and, at other times, anti-clockwise.

Therefore, during the first operation of the cycle, which is the mixing, the blades (2) rotate in an anti-clockwise direction and the mincing spindle (18) remains inactive.

During emptying of the vat (1) through the lower passage mouth (16) towards the spindle (18), in the mincing body (19) the blades (2) and (2a) rotate in an anti-clockwise direction while the spindle (18) works in a normal progressive direction.

During kneading of the meat, carried out in the vat (1) with its lower trap door (15) closed and therefore isolated from the mincing body (19), the blades (2) and (2a) rotate in a clockwise direction. This kneading operation is subsequent to that of mincing, which must be carried out in certain cases, for which the minced meat already poured out through the front mouth of the exit (22) and collected in an adequate container (not represented), is poured into the vat (1) once again, proceeding with said kneading, an operation wherein the meat is pressed against the vat (1) walls, causing the elimination of any air bubble inside the mass; said air, in turn, exits towards the exterior through the slots (11) of the lid (7), wherethrough the usual complementary products, such as spices and similar, are conveniently introduced during this kneading process.

It is precisely this previously described capacity of the machine, which allows it to carry out this kneading operation, that confers the dual mode operation characteristic.

Upon completion of the kneading and macerating operation, the vat (1) is tilted towards one side and can be emptied. During this operation, the blades (2) rotate in an anti-clockwise direction.

The machine also has, together with its necessary control panel (26), preferably, push-buttons (27) for safe actuation of the blades (2) and (2a) in the interior of the mixing vat (1) when it has been tilted and is being emptied.

This operation is carried out advantageously and without manual intervention through the action of the blades (2) and (2a) themselves, rotating in a clockwise direction, whereupon it is essential, for obvious safety reasons, that the movement of said blades is only carried out when the two push-buttons (27) are preferably actuated simultaneously by the user, preventing the introduction of a hand in the interior of the vat (1) during operation of the blades (2) and (2a), which could cause a serious accident.

Always in accordance with the safety regulations, in conjunction with the set of two push-buttons (27) for actuating the blades (2) and (2a) to empty the forward-tilted vat (1), there will be the necessary microswitches for protecting, as mentioned earlier, all the mobile or displaceable elements of the machine, in addition to the necessary timers for programming the times of the different operating phases to be carried out.

The machine that is the object of this invention is completed by the front and rear frames (28), whereto the transverse axle (3) is fixed, together with the mixing vat (1) itself and the geared motor assembly (4/5), in addition to the following protective fairings: the fairing (29) that covers the front part of the mincing area and the geared motor (20/21), the fairing (30) that covers the side part of the machine and that extends along the rear part, reference (31) to cover the area with the geared motors.

The machine assembly is disposed on an adequate frame or foot (32), the height of which is related to that of the product removal containers.

Having sufficiently described the object of the present invention, we must point out that any variation in the dimensions, outer shapes, finishing and types of materials used, in addition to the known mechanisms that integrate the machine assembly, shall not alter the essentiality thereof in any manner, which is summarised in the following claims.

It will be understood that each of the elements described above, or two or more together, may also find a useful application in other types of constructions differing from the types described above.

While the invention has been illustrated and described as embodied in a meat mincing and mixing machining having dual mode operation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A meat mincing and mixing machine with a dual mode operation, comprising a tilting mixing vat with inner rotating mixing blades fixed to a longitudinal horizontal axis; means for actuating said tilting mixing vat; a support and fixation device for supporting said axle detachably together with said mixing blades for cleaning and maintenance; a mincing body supporting said vat and being separated by a sliding track door, said mincing body being provided with a mincing spindle located inside said mincing body with a horizontal axis and a longitudinal direction, parallel to said longitudinal horizontal axle of said mixing blades and aligned against a front exit mouth; a protective casing covering said front exit mouth and rotating about a lower axle; means for actuating said mincing spindle; a folding screen provided at the rear of said vat and protecting against splattering; and actuation controls.

2. A meat mincing and mixing machine having dual mode operation as defined in claim 1, wherein said means for actuating said rotating mixing blades includes a gear reduction assembly with an electric motor.

3. A meat mincing and mixing machine having dual mode operation as defined in claim 1, wherein said means for actuating said mincing spindle includes a further gear reduction assembly and a further electric motor.

4. A meat mincing and mixing machine having dual mode operation as defined in claim 1, wherein said mixing vat which is frontally and rearly fixed to frames, is equipped with a lid for aperture thereof which tilts on rear hinges, said lid having a window and slots for introducing additives and releasing air, and further comprising a safety latch, arranged so that said vat upon removing said safety latch is tiltable and tippable towards one side of said longitudinal axle on said longitudinal axle, actuating an upper lever for emptying it after a mixing operation, during which said blades have been functioning; and a butt guide which defines and limits said tilting and is displaced along an interior of an opening in form of a circular segment disposed on a side of said vat.

5. A meat mincing and mixing machine having dual mode operation as defined in claim 1, wherein said mixing vat has a sliding trap door that closes a mouth, which when open provides a permanent access from said vat to said mincing body, said trap door having handles to facilitate lateral displacement, guided by lateral tracks, in such a manner that when said trap door is opened, a meat mass mixed inside said vat falls through said mouth towards said mincing body, while totally isolating said vat when closed, which is only accessible for filling or emptying thereof, through an upper mouth, said position being necessary when using said vat for a complementary kneading function.

6. A meat mincing and mixing machine having dual mode operation as defined in claim 1; further comprising a control panel for actuating all mechanisms of the meat mincing and mixing machine; and push buttons disposed next to the control panel for safely actuating a rotation of said blades when said vat is tilted forwards in such a manner that they only function when a user actuates said push buttons simultaneously, thereby eliminating a risk of an accident.

7. A meat mincing and mixing machine having dual mode operation as defined in claim 6, wherein said push buttons include two such push buttons.

8. A meat mincing and mixing machine having dual mode operation as defined in claim 1, wherein said means for actuating said mixing blades is configured so that a rotation of said mixing blades is carried out in an anti-clockwise direction during a mixing process phase, while said mincing spindle remains inactive, said rotation continuing in a same direction during exit through a lower mouth, while said mincing spindle is functioning and it rotates in a clockwise direction during a kneading process with a lower trap door closed, finally rotating in an anti-clockwise direction when emptying said vat upon tilting thereof.

9. A meat mincing and mixing machine having dual mode operation as defined in claim 3, wherein said gear reduction assembly and said electric motor for actuating said mixing blades, in addition to said gear reduction and said electric motor for actuating said mincing spindle, have front, side and rear protective fairings, and further comprising height adjustable feet on which the whole assembly rests.

* * * * *